UNITED STATES PATENT OFFICE 2,367,506

SEPARATION AND RECOVERY OF MOLYBDATE AND ALUMINA FROM SPENT CATALYSTS

Alan Kissock, Laurelton, N. J.

No Drawing. Application July 27, 1943,
Serial No. 496,371

1 Claim. (Cl. 23—51)

This invention relates to the processing of spent hydroformer catalyst in such a manner that its constituents are separately recovered in pure and useful form.

Hydroformer catalyst ordinarily consists of activated alumina which has been impregnated with a compound of molybdenum. After a period of use in the hydroformer it becomes "spent" and no longer functions efficiently as a catalyst. It is then removed and replaced by a new charge. Rather than permit discarding its otherwise useful constituents I have found that both the alumina and molybdenum content of the spent catalyst may be separated and efficiently recovered by a procedure of which the following is a description:

Impurities such as silica, iron oxide and other contaminating materials which may have become physically mixed during service of the catalyst are first removed by subjecting the "spent" material to alternate water, alkali or dilute acid washes, in a dry way by tumbling and screening or in any other suitable manner.

The "spent" catalyst is ordinarily in the form of pellets, or irregular shaped particles, which, due to activation, will absorb up to approximately 50 per cent of their weight of water. I have found that by immersion in a solution of suitable strength, it is possible thus to introduce sufficient alkali to combine chemically with all of the molybdenum present to form a soluble alkali metal molybdate. If desired, the particles may be ground and intimately dry mixed with the required amount of alkali. In either case, however, only sufficient alkali is made available to efficiently convert the molybdenum content of the spent catalyst into a water soluble salt.

After thus cleansing and introducing the proper amount of alkali, the mixture is subjected to a temperature of from 1000° to 1200° C. in any suitable type furnace. I have found that if the material is held at this temperature for a relatively short period, for example up to one hour, substantially all of the molybdenum content of the spent catalyst will be converted into a water soluble molybdate, whereas only a very negligible amount of the alumina combines with the alkali to form an aluminate. Under these conditions it would ordinarily be thought that both molybdenum and alumina would form water soluble salts, approximately in the ratio of their content in the spent catalyst and to the extent of the alkali present in the furnace mix. This selective reaction of the alkali is of importance and contrary to expectation.

Subsequent to such heat treatment the calcine may therefore be ground and agitated in water, whereupon the soluble molybdate may be separated from the insoluble alumina by filtration or decantation.

Molybdenum may be made directly available for alloying with steel by precipitation as calcium molybdate, or recovered by any other well-known procedure. The alumina, after drying at 110° C., is of sufficient purity for direct use in the production of metallic aluminum. It may, however, be employed for any other desired purpose.

There follows a more specific example:

One hundred pounds of "spent" catalyst, after cleansing as described, may be assumed to contain 92 per cent alumina and 7.5 per cent molybdic oxide. Immersion of this weight in a 20 per cent solution of sodium carbonate will introduce approximately ten pounds of the alkali into the pores of the catalyst, and any excess solution is decanted therefrom. The alkali impregnated material may be heated, for example, in a rotary kiln, and held at a temperature of 1150° C. for 30 minutes. The calcine therefrom may be passed through a magnetic field to remove any remaining iron oxide, ground to approximately 20 mesh and agitated in sufficient water to insure complete solution of its molybdenum content. The alkali metal molybdate solution is separated from the insoluble alumina by filtration or decantation and recovered therefrom by precipitation as calcium molybdate or by any other desirable procedure. The alumina, after drying, is a high-grade marketable product.

The terms used in describing and claiming this invention have been used in their descriptive sense and not as terms of limitation, and it is intended that all equivalents of the terms used be included within the scope of the appended claim.

I claim:

A process for the separation and recovery of a molybdate and alumina from spent catalyst which comprises the introduction of an alkali metal salt in sufficient amount to combine with the molybdenum content of the spent catalyst, and heating the mixture in air so that alumina and a soluble molybdate of the alkali metal are formed.

ALAN KISSOCK.